S. A. WEHMEYER.
BAKING OVEN.
APPLICATION FILED MAY 13, 1913.
1,174,110.
Patented Mar. 7, 1916.
2 SHEETS—SHEET 2.
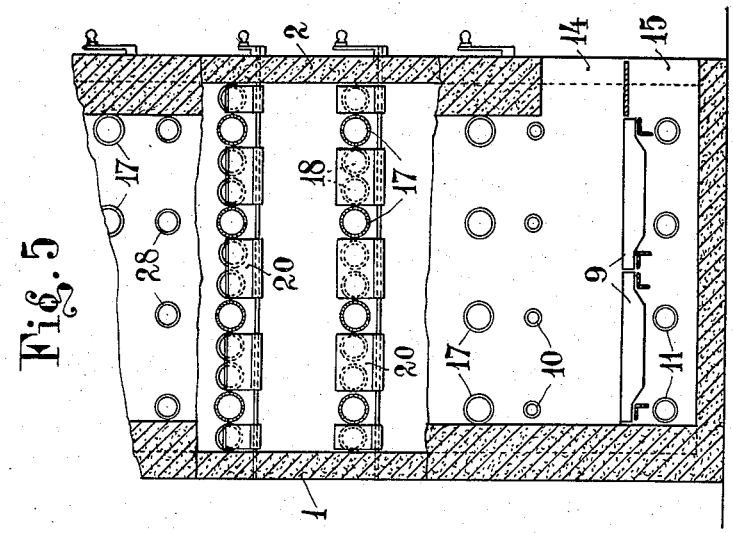
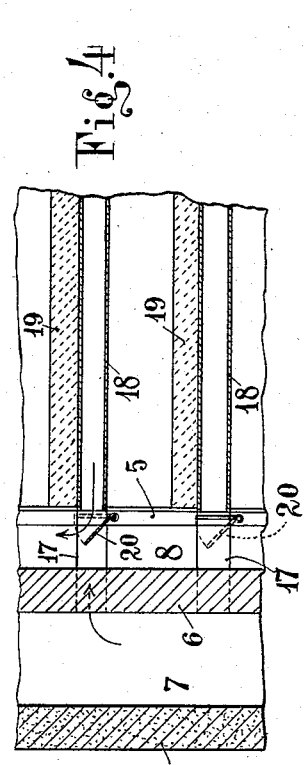
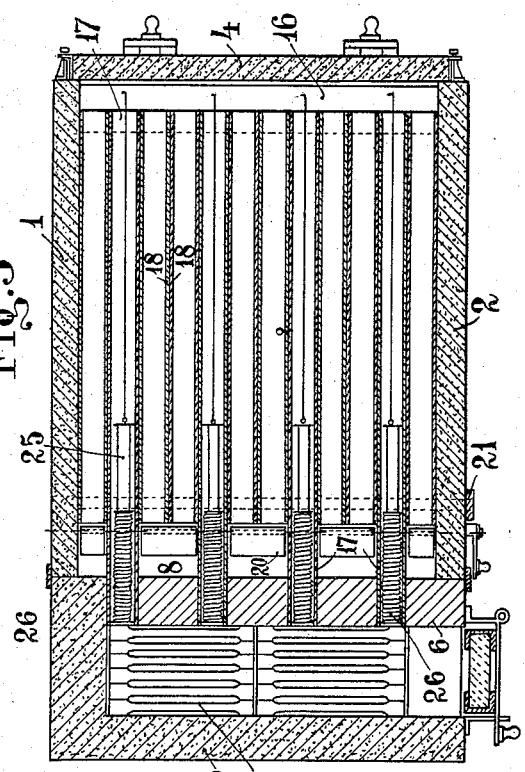
WITNESSES:
J. J. Wallace
Rene Bruine
INVENTOR:
Silvano Adolfo Wehmeyer
By Attorneys,
THE COLUMBIA PLANOGRAPH CO., WASHINGTON, D. C.

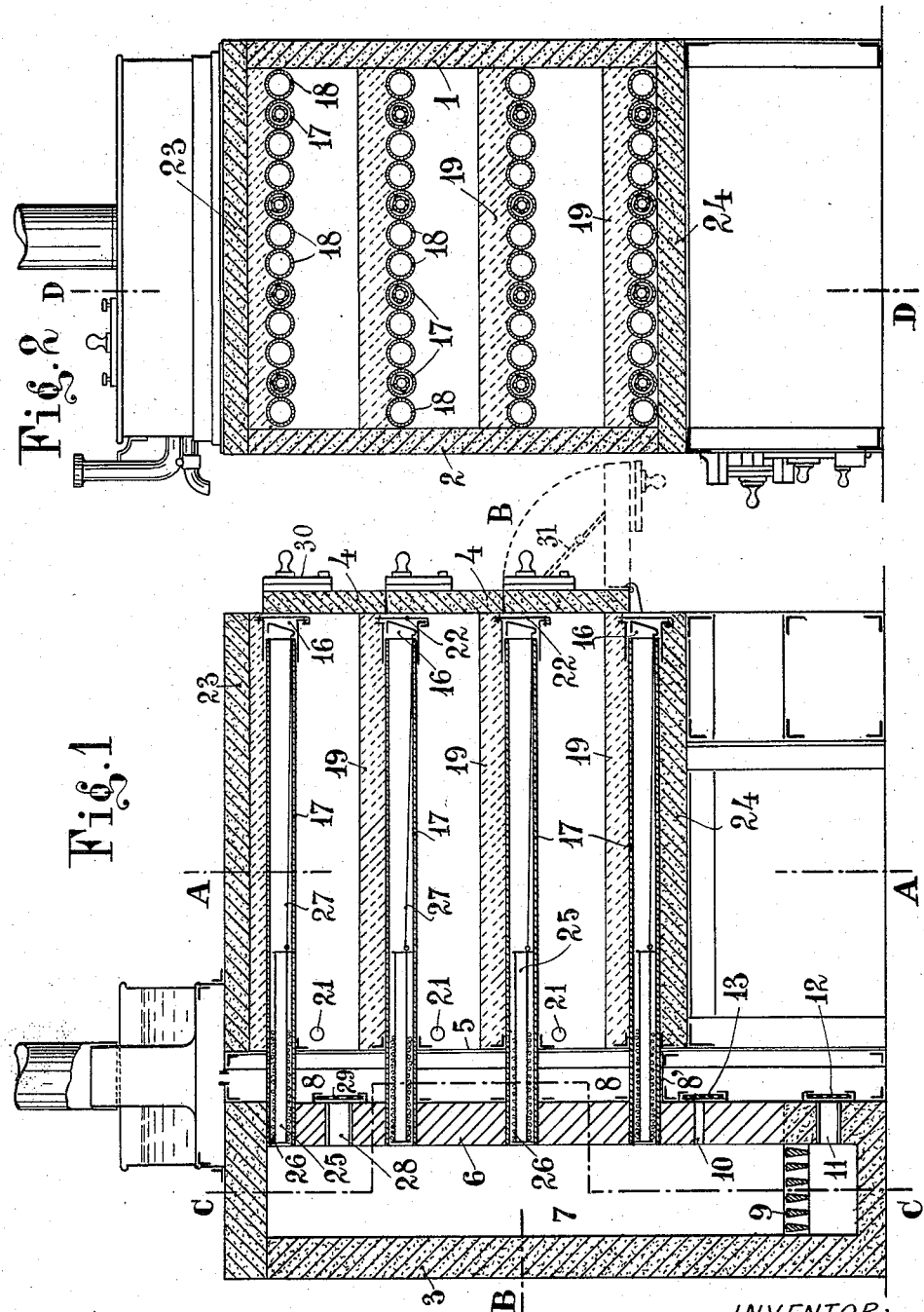

UNITED STATES PATENT OFFICE.

SILVANO ADOLFO WEHMEYER, OF TURIN, ITALY.

BAKING-OVEN.

1,174,110. Specification of Letters Patent. Patented Mar. 7, 1916.

Application filed May 13, 1913. Serial No. 767,282.

*To all whom it may concern:*

Be it known that I, SILVANO ADOLFO WEHMEYER, a subject of the King of Italy, and a resident of Turin, Italy, have invented a new and Improved Baking-Oven, of which the following is a full, clear, and exact description.

This invention relates to certain improvements in baking ovens, of that type in which the baking chamber is heated by the flow of hot gas through passages disposed within or adjacent said baking chamber.

One of the objects of my invention is to simplify the construction by utilizing the conduits for the hot gas as the partitions between adjacent baking compartments.

A further object is to afford a more nearly perfect and uniform distribution of heat by forming the return passages of greater cross-sectional area than the supply passages, and of about twice the heating surface of said supply passages.

The oven is so constructed that the separate baking compartments may be heated individually or collectively; each compartment is provided with a separate access, and is heated both from above and below, and besides it is provided with an independent thermometer and with a special damper for the regulation of heat.

The invention consists in the construction and combination of parts defined in the claims. One embodiment of my invention will be hereinafter described in detail.

Reference is to be had to the accompanying drawings forming part of this specification, in which similar characters of reference indicate corresponding parts in all the figures, and in which—

Figure 1 is a vertical section through a baking oven constructed in accordance with my invention; Fig. 2 is a vertical transverse section on the line A—A of Fig. 1; Fig. 3 is a horizontal section on the line B—B of Fig. 1; Fig. 4 is a partial vertical section on the line D—D of Fig. 2; and Fig. 5 is a vertical transverse section on the line C—C of Fig. 1.

In the specific form of baking oven illustrated in the accompanying drawings, there is provided an outer or inclosing casing having side walls 1 and 2, end walls 3 and 4, a top wall 23, and a bottom wall 24. These walls are formed of suitable insulating material so as to conserve the heat within the oven, and they may be of any well-known type of construction. Within the inclosing casing there is a vertically extending wall 5, which with the end wall 4 constitute the opposite ends of the baking compartments. This wall 5 is disposed at a distance from and parallel with the end wall 3, and between this end wall and the vertical wall 5, there is an intermediate wall 6 sub-dividing the space into two compartments or chambers 7 and 8. The chamber 7 constitutes the combustion chamber, and at its lower end is provided with a fire-grate 9, above and below which are openings 14 and 15 provided in the side wall 1. The opening 14 above the grate serves for the admission of fuel, while the opening 15 below the grate permits of the withdrawal of ashes from beneath. In one of those walls of the combustion chamber which are situated in the directiton of the greatest length of it, for instance in the wall 6, there are provided a plurality of small holes 10 above the grate, and a plurality of larger holes 11 below the grate. The air that feeds the combustion enters under the fire-grate through the said holes 11 and the draft through these holes may be regulated by a suitable sliding damper 12. These air inlet holes 11 being distributed along the wall 6 which is in the direction of the greatest length of the fire-grate, insure the uniform distribution of the air to the glowing coal, and thus insure the proper and uniform burning. The fire adjacent one end of the grate will be of the same intensity as that adjacent the opposite end, and equal quantities of gas at the same temperature will enter all of the heating tubes hereinafter referred to. As to the smaller holes 10, they have a smoke-consuming scope, and may be regulated by a sliding damper 13.

The chamber 7 is closed at the top, but the wall 6 is provided with a plurality of openings through which the gases of combustion may escape. These openings communicate with a plurality of conduits or tubes 17—which extend across the passage 8, through the wall 5, and across the baking chamber. These tubes 17, through which the gaseous products of combustion must pass, and which in the following pages will be indicated as delivery or supply tubes, do not communicate with the passage 8, nor do they communicate with the baking chamber between the walls 4 and 5. At the extreme ends of the tubes 17 opposite to the ends communicating with the combustion chamber, there is a transversely extending conduit 16, with which communicate the said ends of all the conduits 17 as well as one of the ends of other tubes 18 which will be hereinafter indicated as return tubes. Adjacent to each delivery tube 17, and preferably disposed one at one side and the other at the other side thereof, are situated conduits or tubes 18, or return tubes, whose number is double that of the supply tubes. These return tubes 18 put in communication the transverse conduit 16 with the space 8 comprised between the walls 5 and 6, which space in its upper part communicates with the chimney. The lower part of the space 8 is separated from the said upper part by means of a partition 8'. The return tubes as well as the delivery tubes have the same external diameter, so that the heating surface corresponding to the return tubes 18 is twice the heating surface of the delivery or supply tubes 17.

The reason for making the surface of the return tubes double of that of the supply tubes, is that of equalizing the quantity of heat transmitted by each section of "heating element"; this effect is not reached by using "heating elements" consisting of a supply tube and a return tube of equal diameter, because in the return tubes are contained heating gases whose temperature is lower than that of the gases passing in the supply tubes. On the contrary, by using two return tubes, so that their radiating surface is twice the surface of the supply tubes, the heat radiated from the surface of each set of two return tubes is approximately equal to the heat radiated from the corresponding supply tube. The quantity of heat radiated from the return tubes diminishes more and more in each successive portion of them in the direction of the travel of the heating gases, and it diminishes gradually an amount practically corresponding to the increase of the quantity of heat radiated from the surface of the supply tube which is adjacent to the said two return tubes, so that the total amount of heat emitted by every section of three tubes constituting a "heating element" is practically constant. But, as in proximity of the combustion chamber the supply tubes 17 emit too much heat, each of these tubes 17 is provided with a tubular screen 25 consisting of a piece of tube of smaller diameter than that of the tubes 17 and concentrically disposed in regard to them, as it may be seen in section in Fig. 1 and in plan view in Fig. 3. These tubular screens 25 extend inside the tubes 17 from the combustion chamber about one-fourth the efficient length of the said tubes 17 in the baking chambers, and their function is that of forming a double wall which diminishes the emission of heat for a suitable length of the first part of the supply tubes. The edges of the ends of the said internal tubes or tubular screens 25 are bent outward so as to form flanges for the purpose of centering them inside the tubes 17. Besides, in that part in which the tubes 17 passing from the combustion chamber through the passage 8 are especially exposed to useless heat radiation directly to the chimney, the said internal tubes or screens 25 are covered with asbestos cord 26 or with another suitable non-conducting material, in order to avoid an unnecessary dispersion of heat. Each of the said tubular screens is connected to a metallic draw rod 27, which serves to put them in the right place and to take them out when it is desired to proceed to the cleaning of the smoke conduits.

The tubes 17 and the corresponding tubes 18 are arranged horizontally, as it is clearly indicated in Fig. 2, so that each row of tubes constitutes a partition or shelf and divides the different baking compartments from one another. The upper surface of each row of tubes is provided with a covering 19 of any suitable material capable of allowing a convenient heat conduction through it, but not a too great conduction, in order to avoid an excessive heating from below of the articles to be baked. The said covering 19 is constructed so as to present in its upper part a smooth surface for supporting the articles to be baked, and it extends from one side wall 1 to the other side wall 2, and from the end wall 5 to the opposite end wall 4. The under sides of all the tubes 17 and 18 are freely exposed so as to facilitate the heating of the space situated beneath it which constitutes the corresponding baking compartment.

For regulating the flow of gases and thus regulating the temperature in the baking compartments, each row of return tubes 18, in that point in which they end in the passage 8, is provided with a hinged damper 20. As illustrated, each damper 20 is pivoted at its lower edge and mounted to swing to a position substantially at 45° above the horizontal position, so as to permit the free flow of the combustion gases, or to swing upwardly to a vertical position so as to cover the ends of all of the return tubes 18 of its corresponding row. The temperature in each compartment may be indicated by a special thermometer 21, and the damper may be regulated in accordance with the readings of this thermometer.

In order to permit the cleaning of the interiors of the conduits, and to permit the removal or repair of the conduits or of the valve plates of the dampers, I construct each of the conduits 16 with an end wall 22 which is removably supported in position. Other cleaning openings may be provided in the walls opposite to the chambers 7 and 8.

To permit access to be gained to the several baking compartments the end wall 4 is preferably formed of a series of movable sections, each of which constitutes a door or closure 30 for its corresponding baking compartment. These doors are formed of metallic material covered with insulating material and are hinged at their lower edges so as to swing outwardly. When any door is swung outwardly to a substantially horizontal position and in alinement with the upper surface of the floor of its corresponding compartment, a suitable stop 31 limits the further movement of the door so that the containers for the material baked may be readily drawn outwardly on the door, and the latter will serve as a support.

By means of my invention any one of the compartments may be heated independently of the other compartments, the degree of heat may be regulated, access may be readily gained to the parts to clean them, and any part may be readily and quickly replaced in case of injury or breakage. The oven of the present invention is simple in construction, and its use is very efficient, convenient and economical; besides, the space required by this oven is very small, so that it may be very convenient on board of ships, the more that the pitching and rolling movements of the ship have no influence at all on the operation of the oven.

Naturally, instead of making many compartments, as shown on the drawings, one only can be constructed.

At last it is to be noted that in the moment in which the fire is lighted inside the initially cold oven, the burning fuel has a tendency to form a great deal of smoke. In order to prevent that this smoke may soil the several rows of tubes, there are provided in the wall 6 a suitable number of openings 28, which may be closed by means of a damper 29 adjustable from outside. It is clear that by opening this damper the smoke is caused to go directly to the chimney. In this manner is also obtained an easier draft which facilitates a good beginning of the combustion.

Various changes may be made in the construction and operation of the specific oven illustrated, and within the scope of the claims, without departing from the spirit of my invention.

Having thus described my invention, and ascertained the nature of it and in what manner the same is to be performed, I declare that what I claim is:

1. In an oven, the combination with a plurality of tubes adapted to be traversed by hot gases in their passage in one direction, of tubes disposed parallel to said first mentioned tubes and in substantially the same plane, the said return tubes serving for the passage of the gases in the opposite direction, the surface area of the return tubes being substantially double that of the first mentioned tubes.

2. The combination with a combustion chamber, of an oven, a second chamber adjacent the combustion chamber and communicating with the chimney, supply tubes passing through the oven and communicating with the combustion chamber, and return tubes passing through the oven for conveying the hot gases to the said second chamber, and a tubular screen located within the end of each supply tube which communicates with the combustion chamber.

3. The combination with a combustion chamber, of an oven, a second chamber adjacent the combustion chamber and communicating with the chimney, supply tubes passing through the oven and communicating with the combustion chamber, and return tubes passing through the oven for conveying the hot gases to the said second chamber, a tubular screen located within that end of each supply tube which communicates with the combustion chamber, and means for holding such screen out of contact with the tube.

4. The combination with a combustion chamber, of an oven, a second chamber adjacent the combustion chamber and communicating with the chimney, supply tubes passing through the oven and communicating with the combustion chamber, and return tubes passing through the oven for conveying the hot gases to the said second chamber, a tubular screen located within the end of each supply tube which communicates with the combustion chamber, and means for holding the said screen in concentric relation with the tube and spaced at a distance therefrom.

5. The combination with a combustion chamber, of an oven, a second chamber adjacent the combustion chamber and communicating with the chimney, supply tubes passing through the oven and communicating with the combustion chamber, and return tubes passing through the oven for conveying the hot gases to the said second chamber, a tubular screen located within the end of each supply tube which communicates with the combustion chamber, and heat insulating material surrounding the end of said screen adjacent the combustion chamber.

6. The combination with a combustion chamber, of an oven, supply tubes disposed in the oven and in communication with the combustion chamber, a screen associated with each of said tubes at its combustion chamber end, and means for adjusting the position of the screen within the tube.

7. In an oven, the combination with a plurality of heat supply tubes extending from end to end of the oven, of a series of return tubes of substantially double the surface area of the supply tubes located adjacent thereto and substantially in the same horizontal plane.

8. In a device of the character specified, the combination with a combustion chamber and a chimney, of a series of baking compartments disposed one above the other, tubes disposed substantially in the same horizontal plane for the supply and the return of the combustion gases, the said tubes being arranged in such manner as to be in communication with the combustion chamber and with the chimney, and means for controlling and regulating the passage of the heating medium through the tubes in each compartment independently of the tubes of the other compartments.

9. The combination with a baking compartment, of a series of heating tubes disposed in the upper part of the baking compartment and a series of heating tubes disposed upon the bottom of said compartment, each series comprising supply and return tubes disposed in substantially the same horizontal plane, means for regulating the passage of the gases in the supply and return tubes situated in the upper part of the said compartment, and means independent of the said regulating means for regulating the passage of the gases in the supply and return tubes situated in the bottom part of the said compartment.

10. The combination with a series of baking compartments, of a series of heating tubes disposed in the upper part of each baking compartment and a series of heating tubes disposed upon the bottom of each compartment, each series comprising supply and return tubes disposed in substantially the same horizontal plane, and means for regulating the passage of the gases in the supply and return tubes situated in the upper part of each said compartment, and means independent of the said regulating means for regulating the passage of the gases in the supply and return tubes situated in the bottom part of each said compartment.

In witness whereof, I have hereunto signed my name in the presence of two subscribing witnesses.

SILVANO ADOLFO WEHMEYER.

Witnesses:
   ING. EISSEHIM FADDO,
   COPPO ALBERTO.

Copies of this patent may be obtained for five cents each, by addressing the "Commissioner of Patents, Washington, D. C."